United States Patent [19]

Rigdon et al.

[11] 4,238,409

[45] Dec. 9, 1980

[54] FROTH FLOTATION WITH PETROLEUM OXIDATE-AMINE COMPOSITIONS

[75] Inventors: Orville W. Rigdon, Groves; Gordon R. Schierberg, Port Arthur, both of Tex.; Lawrence H. Keon, Croton-on-Hudson, N.Y.

[73] Assignee: Texaco Inc., White Plains, N.Y.

[21] Appl. No.: 59,090

[22] Filed: Jul. 19, 1979

[51] Int. Cl.³ .......................... C07C 97/03; B03D 1/00
[52] U.S. Cl. ................................ 260/501.17; 209/166
[58] Field of Search ..................................... 260/501.17

[56] References Cited

PUBLICATIONS

Wagner et al., Synthetic Organic Chem., John Wiley & Sons, N. Y., pp. 567–568, 1965.
McKinley et al., 49, 9919(d), 1955.
McGarry, Chem. Absts., 52, 9538(g), 1958.
Hollingsworth et al., Chem. Absts., 53, 3626(a), 1951.
Bunge et al., Chem. Absts., 63, 283(b), 1965.
Ray et al., Chem. Absts., 65, 11855(a), 1966.

*Primary Examiner*—Natalie Trousof
*Assistant Examiner*—G. T. Breitenstein
*Attorney, Agent, or Firm*—Carl G. Ries; Robert A. Kulason; Henry W. Archer

[57] ABSTRACT

Disclosed are cationic flotation agents for separating silica from ores consisting of the monocarboxylic acid salts of polyalkylene polyamine amides wherein the amide is completely neutralized.

2 Claims, No Drawings

FROTH FLOTATION WITH PETROLEUM OXIDATE-AMINE COMPOSITIONS

BACKGROUND OF THE INVENTION

The present invention concerns the provision of novel cationic collectors for the concentration of ores by flotation and a method for making the same. More specifically, the invention relates inexpensive, highly soluble materials intended for replacement of the tall oil-amine derivatives in the second stage of the two stage flotation process for the benefication of phosphate ores for fertilizer manufacture.

Conventionally, in the two stage flotation process, the finely ground phosphate rock is mixed with water and small amounts of fatty acid, sodium hydroxide and kerosine (or fuel oil) and charged to a flotation cell where air is bubbled through the suspension. The oil coats the phosphate particles which attach themselves to air bubbles and rise to the surface were they are skimmed off. Sand particles are not wetted by the oil and sink to the bottom where they are drawn off continuously. Perfect separation is not obtained, however. To obtain further concentration, the product from the first flotation (rougher) step is washed with dilute sulfuric acid which removes most of the chemicals with which the phosphate particles are coated and, with water, which removes the oil as a slime. The deslimed material is then subjected to a second flotation step in which the reagents are an amine or amine derivative, sodium hydroxide, and a frothing agent such as a five or six carbon alcohol. These reagents coat the sand which floats to the surface leaving the phosphate concentrate which is removed from the bottom of the second cell as the underflow or unfloated portion of the ore.

STATEMENT OF THE PRIOR ART

The prior art to which this invention relates is aware of the following U.S. Pat. Nos.: U.S. Pat. Nos. 2,811,254; 2,857,331 3,179,250 and 3,265,211. More specifically, U.S. Pat. No. 2,811,254 describes a two stage flotation process for benefication of phosphate rock. U.S. Pat. No. 2,857,331 discloses a flotation reagent made by reacting tall oil or tall oil pitch with an alkylene or polyalkylene amine, e.g. diethyl-enetriamine but does not disclose the reaction of an amide with acetic acid to give a more soluble salt. U.S. Pat. No. 3,179,250 suggests using in a froth flotation process a flotation collector consisting of ethoxylated or propoxylated fatty acids and amides. U.S. Pat. No. 3,265,211 discloses a froth flotation process utilizing a fatty amine with a mixture of nitrogen compounds resulting from the refining of gilsonite. Israeli Pat. No. 10939 discloses use of petroleum oxidates and their salts as reagents for flotation separation of phosphate ores containing CaCO$_3$ but not SiO$_2$, and not the amine or amide salts. Stremovskii in "Investigation of Wood Pulp and Petroleum Industry Products for Flotation of Phosphate Raw Material of the Chemical Industry," *Flotatsion* Reagenty i iklr Svoistva, Akad. Nauk S.S.S.R, Inst. Gorn Dela 1956, 102-9. (Reference CA 55-13785*i*) does not mention amine reaction products although amines are used as co-reagents.

SUMMARY OF THE INVENTION

There is provided, in accordance with the invention, cationic flotation agents for separating silica from ores consisting of the monocarboxylic acid salts of polyalkylene polyamine amides. These salts are used, together with 10 to 15 weight percent of C$_4$ to C$_8$ primary alcohol, kerosene, pine oil, crude polyglycol or carbinols as frothing agents, in the flotation process.

The present compounds are prepared by charging into a vessel equipped with heating means, a condenser and a water trap, a nitrogen sparger, a stirrer and an additional funnel, an oxidate (I) and a polyamine (II) on an equivalent weight basis with enough inert solvent such as toluene to provide a fluid mixture. The amine is charged slowly enough to prevent a rapid temperature rise. When the amine addition is terminated, the mixture is heated to reflux (270°–290° F.) and the water in the resulting toluene-water azeotrope is removed. Refluxing is continued until no more water is evolved.

After water removal, the solvent is then removed. Temperature is restricted to around 350° F. during condensation. As shown in Table I, not all of the toluene is recovered. The unrecovered solvent is assumed to have been lost to the atmosphere. Removal of solvent is continued until no more solvent appeared to be coming overhead.

The reaction product (III) is then cooled to approximately 125° F. and a frothing agent (Hydrogenated Croton Oil) is added in an amount such that it would constitute approximately 15 wt% of the final product. The neutralization of the "free base" amines with acetic acid (Glacial) is accomplished by slowly charging the acetic acid with stirring while holding the temperature at 135° F. maximum. The 135° F. maximum temperature restriction is necessary to avoid partial destruction of the acetate salts through imidazoline formation. Enough acetic acid is charged to neutralize all remaining unreacted amine groups and form the product (IV), generally a 2:1 ratio of acid to amine.

The process can be summarized as follows:

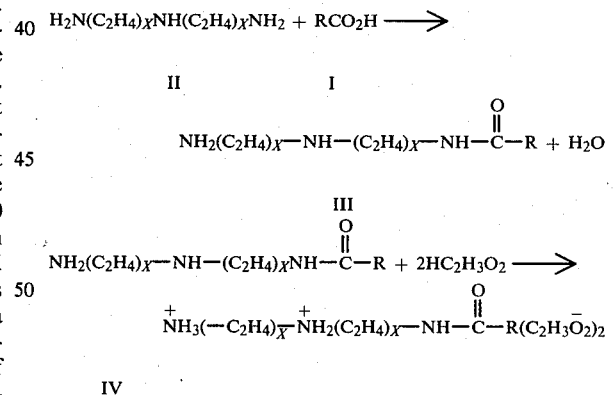

wherein X ranges from 1 to 5 and R ranges from 1 to 15 carbon atoms. The preferred amine is diethylene triamine but any polyalkylene polyamine is suitable.

The wax oxidates used in the present invention preferably are produced by reacting mineral oils petrolatum, or often discarded slack wax, with air in the presence of a catalyst at a temperature between 270° and 400° F. at a pressure below 90 psig and at an air rate between 15 and 35 cu ft. of air per pound of reactant per hour. These oxidates have a nominal neutralization number ranging from 120 to 220 and preferably from 140 to 180. A more complete explanation of their method of preparation and examples thereof are set forth in coassigned U.S. Pat. No. 2,705,241 to McKinley et al. The fact that these oxidates are very inexpensive renders the present reagents economically attractive.

EXAMPLES

The invention is further illustrated in non-limiting fashion by the following examples which are tabulated in Table I below. The products of these examples gave the test results shown in Table II, below.

Compositions A, B and C were tested in regular froth flotation cells using a feed containing 24 percent BPL (Bone Phosphate of Lime or Calcium triphosphate). The same feed was also treated with a commercially available flotation agent "X" an amino-amide made by the condensation of tall oil fractions with diethylene triamine followed by 70 to 90 percent neutralization of the free base amine with acetic acid to provide water dispersibility. The results are tabulated in Table III. In the table, the abbreviation "conc." refers to the phosphate product and the silica float is designated as "tails" for tailings. The selectivity factor (Sels. Fac) is calculated by dividing the concentrate BPL by the corrected (to zero insolubility) concentrate BPL.

The amount of reagent plus frothing agent used ranges from 0.20 to 1.0 pound per ton of feed. In the tests reported in Table III, a fuel oil (kerosene) was used in the amounts stated to increase the pulling power of the reagents. Where compositions "A" and "X" each were used on a 1:1 ratio with kerosene, it is seen that the selectivity factor, a measure of the ability of the reagent to pull sand off, was quite comparable. However, the cost of producing the reagents of the invention is considerably less than that of brand "X."

While the present reagent is particularly adapted for the treatment of phosphate ores by flotation, it can be used with advantage in beneficiating other ores by removing sand therefrom, including iron ores, feldspar, kyanite boryte, fluorspar and the like.

TABLE I

| SUMMARY OF REACTION PROCEDURE AND RECOVERY | | | |
|---|---|---|---|
| Example | 1 | 2 | 3 |
| Charge Oxidate (Neut. No.) | 160 | 180 | 140 |
| " | 1023 | 1052 | (70) |
| Weight Charged, g | 1420 | 1164 | 1508 |
| Weight Toluene Charged, g | 400 | 400 | 400 |
| Charged Diethylene Triamine | | | |
| Weight Charged, g | 412 | 412 | 412 |
| Time to Charge, minutes | 34 | 65 | 55 |
| Temperature Range | | | |
| (initial/final), F. | 150/245 | 165/250 | 155/215 |
| Water Removal | | | |
| Weight removed, g | 117 | 144 | 141 |
| Time to remove, hours | 5.8 | 11.3 | 7.9 |
| Temperature (initial/ | | | |
| final), F. | 245/272 | 255/280 | 255/295 |
| Toluene Removal | | | |
| Weight removed, g | 370 | 346 | 351 |
| Time to remove, hours | 3.8 | 4.5 | 4.7 |
| Temperature range (initial/ | | | |
| final), F. | 270/355 | 280/335 | 286/345 |
| Cooling to 125 F., hrs | 3.0 | 2.5 | 1.0 |
| Weight Hydrogenated Croton Oil Charged | | | |
| Croton Oil Charged, grams | 408 | 364 | 424 |
| Charged Acetic Acid (glacial) | | | |
| Time to charge, minutes | 82 | 120 | 60 |
| Temperature (initial/ | | | |
| maximum), F. | 122/135 | 125/134 | 125/135 |
| Weight charged, g | 480 | 480 | 480 |
| Recovery | | | |
| Flotant | | | |
| Grams | 1048 | 1056 | 1059 |
| Weight Recovered, g | 2565 | 2239 | 2639 |
| Total Weight Recovered, g | 3052 | 2729 | 3131 |
| Total Weight Charged, g | 3120 | 2820 | 3224 |
| Total Weight Lost, g | 68 | 91 | 93 |
| % Recovery | 97.8 | 96.8 | 97.1 |

TABLE II

| FLOTANT TESTS RESULTS AND COMPOSITIONS | | | |
|---|---|---|---|
| Example | 1 | 2 | 3 |
| Sp Gr 20/20 C | 1.0531 | 1.0749 | 1.0139 |
| Flash, COC, F | 210 | 240 | 210 |
| TAN | 181 (172) | 205 (197) | 185 (167) |
| TBN | 74.7 (86.0) | 111.4 (98.5) | 108.3 (83.5) |
| Color ASTM Dilute | 5.0 | 8.0+ | 6.0 |
| Nitrogen, Wt % | 6.0 (6.5) | 7.0 (7.4) | 5.8 (6.3) |
| Viscosity, SUS | | | |
| at 210° F. | 269.5 | 359.4 | 194.5 |
| at 130° F. | 2788 | 4645 | 1385 |
| Solubility, 1.0 wt % in H$_2$O (Visual) | Complete | Complete | Complete |
| Composition:[2] | A | B | C |
| Acetic Acid Salt of Diethylenetriamine Amide of Oxidate, Wt % | 85 (Ex 1) | 85 (Ex 2) | 85 (Ex 3) |
| Hydrogenated Croton Oil, wt % | 15 | 15 | 15 |
| Total, wt % | 100 | 100 | 100 |

[1]Numbers in ( ) are calculated theoretical values.
[2]Also included under the general category of "oxidates" are non carboxylic materials known to be present but not quantitaed. These include alcohols, ketones, esters, estolides, lactones and paraffins.

TABLE III

| FLOTATION COMPARISON TESTS | | | | | | | | |
|---|---|---|---|---|---|---|---|---|
| Composition (Amine to Kerosene 2:1) | LBS TON | BPL REC. | CONC. BPL | CONC. INSOL | TAILS BPL | FEED BPL | SEL FAC | CONC. ZERO INSOL. |
| A | .20 | 99.72 | 59.70 | 19.80 | 1.46 | 53.6 | .80 | 74.44 |
|   | .40 | 98.72 | 72.14 | 3.87 | 2.55 | 53.5 | .96 | 75.04 |
|   | .60 | 96.43 | 73.17 | 2.59 | 6.73 | 54.1 | .97 | 74.76 |
|   | 1.00 | 92.84 | 73.43 | 2.17 | 11.89 | 53.6 | .98 | 75.06 |
| B | .20 | 99.31 | 66.72 | 11.62 | 1.82 | 53.5 | .88 | 75.49 |

TABLE III-continued
FLOTATION COMPARISON TESTS
| Composition (Amine to Kerosene 2:1) | LBS TON | BPL REC. | CONC. BPL | CONC. INSOL | TAILS BPL | FEED BPL | SEL FAC | CONC. ZERO INSOL. |
|---|---|---|---|---|---|---|---|---|
| | .40 | 97.46 | 72.75 | 2.60 | 4.80 | 53.5 | .97 | 74.69 |
| | .60 | 95.66 | 73.50 | 2.07 | 7.79 | 53.8 | .98 | 75.50 |
| | .80 | 92.27 | 73.64 | 1.09 | 12.68 | 53.7 | .98 | 75.14 |
| | 1.00 | 89.39 | 73.57 | 1.99 | 16.12 | 53.4 | .98 | 75.06 |
| C. | .20 | 99.80 | 57.23 | 22.74 | 1.34 | 52.8 | .77 | 74.07 |
| | .40 | 98.58 | 72.14 | 3.84 | 2.86 | 52.8 | .96 | 75.02 |
| | .60 | 96.67 | 72.92 | 2.24 | 6.13 | 53.5 | .98 | 74.59 |
| | .80 | 94.94 | 73.21 | 2.15 | 9.09 | 54.0 | .98 | 74.82 |
| | 1.00 | 91.64 | 73.35 | 2.01 | 13.59 | 53.6 | .98 | 74.85 |
| 1:1 Kerosine | .60 | 96.33 | 73.13 | 2.56 | 6.73 | 53.7 | .97 | 75.05 |
| | .80 | 94.97 | 73.13 | 2.35 | 8.89 | 53.0 | .98 | 74.89 |
| | 1.00 | 91.65 | 72.71 | 2.60 | 13.74 | 53.5 | .97 | 74.65 |
| X(1:1 Kerosine) | .20 | 98.83 | 70.93 | 4.56 | 2.55 | 54.0 | .95 | 74.32 |
| | .40 | 98.36 | 72.37 | 2.09 | 3.27 | 53.7 | .98 | 73.91 |
| | .60 | 97.80 | 73.39 | 1.51 | 4.23 | 54.0 | .98 | 74.52 |
| | .80 | 96.63 | 72.45 | 1.38 | 6.31 | 53.5 | .99 | 73.46 |
We claim:
1. A flotation reageant having the formula:
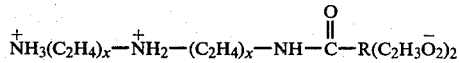
wherein x ranges from 1 to 5 and R is an alkyl group having from 1 to 15 carbon atoms.
2. The reagent of claim 1 wherein x is 1.